United States Patent Office 2,833,758
Patented May 6, 1958

2,833,758

METHOD OF PRODUCING RAPIDLY SOLUBLE CELLULOSE ETHER POWDERS

Rudolf Köhler, Dusseldorf, and Werner Scherff, Hilden, Germany, assignors to Henkel & Cie. G. m. b. H., Dusseldorf-Holthausen, Germany, a corporation of Germany No Drawing. Application April 3, 1953
Serial No. 346,798

Claims priority, application Germany April 5, 1952

11 Claims. (Cl. 260—232)

This invention relates to a process of improving the properties of cold water-soluble but hot water-insoluble cellulose ethers, and more particularly to a process of converting fibrous cellulose ethers of this type into powders having an increased rate of solubility in cold water.

On drying cold water-soluble but hot water-insoluble cellulose ethers, especially methyl cellulose containing considerable amounts of water as it is obtained by the known methylation processes used in industry, products are obtained which dissolve in cold water only very slowly. For practical use, however, products are required which are readily and quickly dissolved in cold water and, thus, possess as high a rate of solution as possible.

It is one object of this invention to provide a method of preparing cold water-soluble cellulose ethers in powder form which are more readily dispersible and soluble in cold water than any of the heretofore known forms of methyl cellulose.

Another object of this invention is to provide a method of preparing dry, freely flowing or pourable powders of methyl cellulose with excellent storing properties and a rapid rate of solution in cold water.

Other objects of this invention and some of the advantageous features thereof will become apparent as the description proceeds.

The process according to this invention consists, in principle, in successively subjecting a moist, etherified, fibrous methyl cellulose containing between about 50% and about 70% of water, preferably about 60% of water, to a homogenizing treatment, to grinding the resulting homogenized paste while wet, and to drying the ground product.

In the production of methyl cellulose and other cellulose ethers, after etherification is complete and preferably after removing sodium chloride formed during reaction by washing with hot water, a moist cellulose ether, such as, for example, methyl cellulose, is obtained which still retains the fibrous structure of the cellulose starting material used for etherification. This fibrous structure is difficult to grind, tends to float on water, and is, therefore, difficult to dissolve. This fibrous structure can be caused to disappear on homogenization according to our invention as is shown from the appearance of the homogenized methyl cellulose which attains, through the homogenization, a pliable and deformable consistency and becomes more and more transparent depending upon the degree of homogenization. If such moist, pliable, deformable material is then ground while wet to a fine moist powder and is finally dried, it may be readily and rapidly dissolved in cold water to form pastes, adhesives, and the like.

An important feature of the present invention is the use, as starting material, of a methyl cellulose containing at least about 50% of water. Only when using such a methyl cellulose is it possible to finally produce by successive homogenization, grinding, and drying, a readily soluble methyl cellulose, the high rate of dissolution in cold water of which surpasses that of any heretofore known methyl cellulose.

A further essential characteristic feature of the present invention is the order in which the treatment is carried out. After complete homogenization the homogenized material is ground in the moist state to reduce its particle size, and is subsequently dried. Furthermore, it is of greatest importance that the temperature, during homogenization, be kept substantially below about 60° C., i. e. the point of coagulation of the methyl cellulose, and that drying be effected substantially above said temperature. When using a starting material with a specific water content, proceeding in the stated order of homogenizing, grinding, and drying, and maintaining the temperature during such homogenizing, grinding, and drying at the stated values, it is possible to produce a freely flowing or pourable, readily soluble methyl cellulose powder which dissolves very rapidly in cold water and forms aqueous solutions useful for many purposes.

The methyl cellulose used for this process may be produced from cellulose of different origin, for instance, from cellulose derived from pine wood, from oat hulls, or from cotton linters. Various methods of etherification may be employed. For instance, gaseous methyl chloride may be reacted with alkali cellulose. According to our invention, an especially advantageous process consists in reacting liquid methyl chloride at a temperature below about 90° C. with alkali cellulose. Methyl chloride is employed in an amount by weight which is at least five times that of the air-dry cellulose used for methylation. The degree of etherification to produce methyl cellulose most suitable for the process of this invention may be such that the resulting methyl cellulose contains between about 1 and about 2.5 methoxy groups for each glucose residue. The resulting crude methyl cellulose contains sodium chloride which may be removed by washing with hot water wherein methyl cellulose is substantially insoluble.

The moist fibrous methyl cellulose obtained according to the above or any of the various known methylation processes is used as starting material for the process of this invention. If required, the water content of such methyl cellulose is adjusted before the treatment to between 50% and about 70% by weight. It is advisable to determine, by preliminary experiments, the optimum water content of the particular kind of methyl cellulose to be subjected to the process according to this invention. The water content depends to a certain extent upon the degree of polymerization of the methyl cellulose used.

The moist fibrous methyl cellulose is worked and kneaded mechanically while subjecting it at the same time to pressure in order to convert it into a practically fiber-free homogeneous paste. For this purpose devices are used which cause said moist fibrous methyl cellulose to flow by subjecting it in such devices to plastic flow under high pressure. Thereby shearing forces are produced which cause homogenization of said material. A simple device for carrying out such homogenization of moist methyl cellulose comprises a pressure-resistant cylinder having a small opening at one end. The material placed into said cylinder is subjected to high pressure by the movement of a piston fitting said cylinder and is forced through said small opening. On passing through said opening, shearing forces result which cause homogenization of the material. To allow said shearing forces to exert their shearing power for a longer period of time, it is advisable to attach a capillary tube or a labyrinth designed in any desired manner to said opening and to force the mass through said capillary tube or labyrinth.

For large scale manufacture, devices which are known by the name "screw-type press" or "kneading pump" or "meshed multiscrew compounder extruders" have proven of great value. In such devices the moist methyl cellulose is advanced by means of a screw conveyor and, at the same time, is subjected to pressure. Shearing forces are generated not only at the cylinder wall but also at the wall of the rotating screw and in the flowing material itself. The screw is preferably designed in such a way that the material, on passing through the homogenizer, is subjected to continuously increasing pressure. The pressure in said screw may increase in linear or in non-linear order. Further data on the construction and operation of such devices is found in the articles published in the journal "Kunststoffe," 1951, pages 414 to 416 and pages 417 to 421, dealing with screw extrusion presses and masticating pumps. These well known compounder extruders may also be used with advantage in our process. All the devices suitable for homogenizing moist, fibrous methyl cellulose have the common characteristic that the moving parts of the homogenization device which advance the material create, at the same time, the pressure to which the material is subjected.

The temperature of the methyl cellulose passing through the homogenizing device tends to increase. Therefore, since methyl cellulose is insoluble in hot water, it is advisable to cool the apparatus so that the temperature of the methyl cellulose does not exceed its point of coagulation, i. e. about 60° C. Therefore, homogenization is carried out between about 0° C. and about 50° C. and, preferably, between 5° C. and 35° C. Pressing and kneading or masticating are continued until the fibrous methyl cellulose is converted into a practically fibre-free, pliable and deformable, translucent to transparent mass. Said pressing and masticating operation may even be continued until the methyl cellulose mass attains the appearance of a completely homogeneous transparent product. Perforated plates may be attached to the discharge opening of the homogenizing device. The homogeneous methyl cellulose paste is then forced under high pressure through the holes of said perforated plates thereby forming needles, filaments, ribbons, or strands of any desired cross-section.

Surprisingly, we have found that the resulting homogeneous fiber-free methyl cellulose paste can be ground or comminuted in various types of specific grinding devices. For this purpose devices which are especially suitable are grinding mills in which the material is ground by parts rotating with a high speed and exerting a cutting or beating effect. The so-called hammer cage mills or burr mills, for instance, have been found to be especially suitable. Such mills comprise hammer mills, the hammers of which are provided with sharp edges and/or are surrounded by a cage or cages of perforated plates. Devices as they are disclosed in German Patent No. 747,122 for comminuting water-containing fibrous, i. e. not homogenized, methyl cellulose, may also successfully be used for grinding the fibre-free homogeneous methyl cellulose paste produced by pressure homogenization according to our invention. The resulting granular non-fibrous product of small particle size possesses surprisingly good storage properties, provided it is not compressed too strongly. Before drying, the material may be classified by screening, wind sifting, cyclone separation, or similar measures.

Drying must be carried out at temperatures above the point of coagulation of methyl cellulose, i. e. above about 60° C. The drying step may be effected in known drying apparatus, such as belt, disk, or rotary driers. Especially suitable are drying apparatus wherein the comminuted material is whirled around in a gas current.

A freely flowing or pourable finely divided powder is obtained by the process of this invention. Said powder, on triturating with 10 to 50 times its amount by weight of cold water, yields, within the surprisingly short time of 15 to 20 minutes, a completely homogeneous solution. Said solution can be used for various purposes; for instance, as wall paper adhesive, thickening agent, binding agent for paints, pigments and the like. The powder may be sifted or ground in order to obtain products of uniform particle size. Such sifting or grinding, however, is not required for producing a product which is readily soluble in cold water.

U. S. Patents No. 2,331,864 and No. 2,331,865 disclose a process of mechanically homogenizing a water-containing fibrous methyl cellulose at temperatures below 50° C. The homogenized product is then dried and the dried product is ground. This process attempts to solve the problem of producing readily cold water-soluble methyl cellulose by only partly homogenizing the moist fibrous methyl cellulose and subsequently drying and grinding the same. When completely homogenizing moist methyl cellulose in this manner, a horn-like product is obtained which, after grinding, yields a difficultly soluble powder. The inventors of the process disclosed in said U. S. patents did not realize that it is necessary to carry out the grinding step before the drying step because only when proceeding in this manner are readily cold water-soluble products obtained. As stated above, it is also very surprising that a completely homogenized moist methyl cellulose paste can be ground.

German Patent No. 747,122 describes rolling and twisting of moist fibrous methyl cellulose. According to said process, however, only the position of the methyl cellulose fibers to each other is changed, as clearly indicated by the terms "rolling" or "twisting." Thus, such process has nothing to do with a comminution of a fiber-free homogeneous methyl cellulose paste. That homogenizing of fibrous methyl cellulose and subsequent grinding of the substantially fiber-free homogeneous paste would lead to products of such excellent solubility as are obtained according to our invention could not be expected because, according to corresponding statements made in both American patents and in the German patent, care must be taken that mechanical treatment (homogenizing and grinding) is not carried too far. Otherwise, on drying, horn-like products are obtained which are difficultly soluble in cold water. According to our invention such unusual care is not necessary. The pressure-homogenized methyl cellulose of our invention may be carried to different degrees of colloiding so that fiber-free substantially transparent extruded parts, filaments, or tubes may be produced and, when ground prior to drying, a superior water-soluble product will be produced.

The following examples serve to illustrate our invention without, however, limiting the same thereto.

*Example I*

Methyl cellulose obtained by reacting alkali cellulose with methyl chloride and containing 1.7 methyl groups per one glucose ($C_6H_{10}O_5$—) unit is freed of its sodium chloride content by washing with hot water. The washed fibrous material contains about 60% of water. It is forced through a screw compounding and extruding press such as described in the said "Kunststoffe" article above referred to wherein, at the same time, it is masticated to form a homogeneous mass. The temperature of the material is kept at about 10° C. to 20° C. by cooling said extruding press. The material is discharged through the orifice of the press in the form of a homogeneous, paste-like, substantially fiber-free, gelatinous strand. Immediately thereafter, the mass is ground in a suitable mill such as a hammer cage mill, burr mill, or the like, to produce a powder of a particle size of about 0.5 mm. diameter. On drying the powder by circulating air, a pulverulent freely flowing or pourable material is obtained which does not require any further treatment. One liter of said powder weighs between 220 grams and 260 grams. 91% of said material consists of particles passing a sieve of 100 meshes per sq. cm. but not passing a sieve of 1600 meshes per sq. cm., or approximately 25 meshes to 60 meshes per linear inch. On triturating said material in 30 times its weight of water, a homogeneous solution is obtained within 15 minutes. Said solution is eminently suitable, for instance, as binding agent for pigments in paints and for other purposes.

The pressure to which the moist fibrous methyl cellulose is subjected during homogenization may vary considerably and is dependent upon the structure and the properties of the starting material. Usually a pressure between about 30 atmospheres and about 60 atmospheres is sufficient to produce a readily soluble cellulose ether. Preferably a pressure of about 50 atmospheres yields satisfactory results with a methyl cellulose as used in the example.

*Example II*

Fibrous methyl cellulose containing about 60% of water is obtained by reacting an alkali cellulose, ripened at 20° C. for about 24 hours, with methyl chloride and washing the reaction product with hot water. Said fibrous crumbly starting material is placed into a cylinder having an inside diameter of 4.2 cm. A tightly fitting piston is inserted under measurable pressure into the one end of said cylinder. The cylinder, at its other end, has a lateral extrusion hole having a diameter of 1.25 mm. and a length of 2.0 cm. The cylinder and the piston closing said cylinder at its one end are placed into a hydraulic press having a cylinder of an inside diameter of 80 mm. The piston is forced, by means of said hydraulic press, into the cylinder filled with moist fibrous methyl cellulose. The methyl cellulose starts to emerge from the hole in said cylinder when subjected to a pressure of about 30 atmospheres measured by means of a manometer attached to the hydraulic press. Its extrusion speed under such pressure is about 0.015 gram per second. On increasing the pressure to 40 atmospheres, the extrusion speed increases to 0.19 gram per second. At such a pressure, homogenization of the methyl cellulose has taken place as is clearly evident from the appearance of the extruded material. Homogenization becomes much more pronounced when increasing the pressure to 50 atmospheres or even to 60 atmospheres. Under such pressure the extrusion speed increases to 0.98 gram per second or 2.17 grams per second, respectively. Methyl cellulose homogenized, for instance, under a pressure of 50 atmospheres is comminuted as described in Example I and is then dried in a tray dryer while passing air at 70–80° C. through said dryer and circulating said air over the material to be dried. A coarse powder is obtained which has completely lost its fibrous structure. On triturating said powder with 30 times its weight of water, a homogeneous smooth solution is obtained within about 20 minutes. Said solution may be used with great advantage as binding agent for pigments in paints used for inside painting and the like.

It is possible, by using the apparatus described above, to calculate the relation between two conditions required to cause homogenization, namely the pressure to be exerted upon the starting material and the flow of said material caused by said pressure. Such calculation of the conditions required to be maintained for homogenization cannot at all be made when using the heretofore employed homogenization devices, or the calculation can be made only with a considerably lower degree of accuracy than when working in said above described apparatus. The flow of curve characteristic for the flow of a material in a capillary tube, as is known, shows that the maximum gradient of or increase in the rate of flow D is dependent on the maximum shearing stress $\tau$.

R. Köhler in "Farben, Lacke, Anstrichstoffe," 1949, No. 2, page 39, gives a good summary on the derivation of these terms and relations.

The shearing stress $\tau$ corresponds to the relation $$\tau = P \cdot \frac{R}{2L}$$

the gradient of or growth in the rate of flow D to the relation $$D = Q \cdot \frac{4}{\pi R^3}$$

In these equations:
P indicates the pressure in units of the metric absolute system (c. g. s. system)
R the radius of the capillary tube in cm.
L the length of the capillary tube in cm.
Q the quantity of material extruding within one second and measured in grams. Said value is used as approximate value in place of the volume To convert pressure $p$ indicated at the manometer of the hydraulic press into pressure P acting upon the material, $p$ must be multiplied by $$\frac{8.0^2}{4.2^2} \cdot 1000 \cdot 981 = 3.57 \cdot 10^6$$

R is 0.062 cm. and L 2.0 cm.

The measured values and the results calculated therefrom are given in the following table for a homogenization temperature of about 20° C.:

| $p$ atmospheres | Q g./sec. | $\tau$ dyne/cm.² | D l./sec. |
|---|---|---|---|
| 30 | 0.015 | 1.96·10⁶ | 80 |
| 40 | 0.19 | 2.62·10⁶ | 1,002 |
| 50 | 0.98 | 3.27·10⁶ | 5,250 |
| 60 | 2.17 | 3.92·10⁶ | 11,600 |

When plotting in a system of coordinates the maximum gradient of or growth in the rate of flow D existing in the capillary tube, in relation to the maximum shearing stress $\tau$ acting in said capillary tube, a curve is obtained which starts at $\tau \approx 1.5 \cdot 10^6$ dyne/cm.² at the same height as the abscissa. Said curve ascends, with increasing shearing stress, first only slightly and subsequently more steeply and finally, at $\tau \approx 2.75 \cdot 10^6$, is transformed into a straight line. Such a slope of the curve is approximately the same with all types of methyl cellulose. The position of the curve is dependent on the properties of the material to be homogenized. For instance, the shearing stress required to induce flow and, thereby, homogenization varies in accordance with the water content of the material, the degree of polymerization of the methyl cellulose, and the temperature. This yield value according to Bingham, i. e. the lowest pressure at which the methyl cellulose will flow, which is indicated by the distance from the ordinate of the point where the curve intersects the abscissa, decreases with decreasing temperature and with increasing water content and increases with increasing degree of polymerization. Furthermore, the steepness of the curve is influenced by the above mentioned properties of the material in such a manner that all those properties which lower the yield value also cause an increase of the steepness of the curve.

In general, it has been found that the shearing stress required to effect homogenization must be of the magnitude of at least 10⁶ dyne per square centimeter. Preferably, the methyl cellulose is homogenized under conditions corresponding to the rectilinear part of the curve.

The process according to this invention is not only applicable to methyl cellulose but may be applied also to other cellulose ethers which are insoluble in hot water but soluble in cold water and which do not contain salt-forming groups, such as ethyl cellulose and others.

We claim:

1. The process of producing a free-flowing granular powder of a cellulose lower alkyl ether selected from the group consisting of methyl and ethyl cellulose, said ether having a high solubility rate in cold water, which comprises the steps of subjecting a hot-water-insoluble, cold-water-soluble fibrous cellulose lower alkyl ether free from salt-forming groups and having a water content of between 50% and 70% by weight, to a homogenizing treatment under pressure while maintaining said moist ether at a temperature between 0° C. and 50° C., grinding the moist homogenized material and thereafter drying the moist ground product at a temperature above 60° C.

2. The process of producing a free-flowing granular powder of methyl cellulose having a high solubility rate in cold water, which comprises the steps of subjecting moist fibrous methyl cellulose having a water content between 50% and 70% by weight to a homogenizing treatment under pressure while maintaining said moist methyl cellulose at a temperature between 0° C. and 50° C., grinding the moist homogenized product in a comminuting device rotating at high speed, and thereafter drying the moist comminuted product at a temperature above 60° C.

3. The process according to claim 2, wherein homogenizing under pressure is effected by simultaneously kneading the moist methyl cellulose.

4. The process according to claim 2, wherein fibrous methyl cellulose having a water content of about 60% is used as starting material.

5. The process according to claim 2, wherein the temperature during homogenization is kept between 5° and 35° C. and substantially below the point of coagulation of said methyl cellulose.

6. The process according to claim 2, wherein the temperature during homogenization is kept between about 10° C. and about 20° C.

7. The process according to claim 2, wherein the fibrous methyl cellulose used as starting material contains between about 1 methoxy group and about 2.5 methoxy groups for each glucose unit.

8. The process of converting a moist fibrous cellulose lower alkyl ether selected from the group consisting of methyl cellulose and ethyl cellulose into a free-flowing granular powder having a high rate of dissolution in cold water, which comprises the steps of homogenizing said moist fibrous cellulose ether having a water content between 50% and 70% by weight under pressure and at a temperature between 0° C. and 50° C., grinding the resulting fiber-free, homogeneous paste, and drying the resulting granular powder at a temperature substantially above the point of coagulation of said cellulose ether.

9. The process according to claim 8, wherein homogenizing under pressure is continued until a transparent homogeneous fiber-free cellulose ether paste is obtained.

10. The process according to claim 8, wherein the shearing stress required to cause homogenization is of the magnitude of at least $10^6$ dyne per square centimeter.

11. The process according to claim 8, wherein homogenization is effected by forcing the moist fibrous cellulose ether under a hydraulic pressure of at least 30 atmospheres through a capillary opening.

References Cited in the file of this patent
UNITED STATES PATENTS 2,331,865   Swinehart et al. _____ Oct. 12, 1943